(12) United States Patent
Capaldi-Tallon (10) Patent No.: US 7,980,902 B2
(45) Date of Patent: Jul. 19, 2011

(54) ELECTRICAL TERMINAL BLOCK AND METHOD OF FIXTURE

(75) Inventor: Alan Capaldi-Tallon, Hayling Island (GB)

(73) Assignee: Apollo Fine Detectors Limited, Havant, Hampshire (GB)

( * ) Notice: Subject to any disclaimer, the term of this patent is extended or adjusted under 35 U.S.C. 154(b) by 8 days.

(21) Appl. No.: 12/449,819

(22) PCT Filed: Feb. 22, 2008

(86) PCT No.: PCT/GB2008/000612
§ 371 (c)(1),
(2), (4) Date: Aug. 27, 2009

(87) PCT Pub. No.: WO2008/107633
PCT Pub. Date: Sep. 12, 2008

(65) Prior Publication Data
US 2010/0035464 A1 Feb. 11, 2010

(30) Foreign Application Priority Data
Mar. 8, 2007 (GB) .................................. 0704519.8

(51) Int. Cl.
*H01R 9/26* (2006.01)

(52) U.S. Cl. ........................................ 439/716; 439/532
(58) Field of Classification Search .................. 439/716, 439/532, 545–549
See application file for complete search history.

(56) References Cited

U.S. PATENT DOCUMENTS 5,624,167 A * 4/1997 Katz .......................... 312/223.1

FOREIGN PATENT DOCUMENTS

JP 7162167 12/1993

* cited by examiner

*Primary Examiner* — Ross N Gushi
(74) *Attorney, Agent, or Firm* — Carmen Patti Law Group (57) ABSTRACT

An electrical terminal block whose base has four or more lugs projecting downwardly from a generally flat under-surface for locking the block against a fixed support having edges which are co-planar, in a plane parallel to the block's undersurface; at least two of the lugs being formed with opposed channels, each open at one side for receiving and laterally abutting against one of two corresponding oppositely-extending edges of the fixed support so as to lock the block against the support, at least two others of the lugs being stops for laterally abutting corresponding edges of the fixed support; whereby the block may be fixed to the support by resting its undersurface against the block and twisting it in the plane of the undersurface until all the lugs are in abutment against the corresponding edges.

27 Claims, 6 Drawing Sheets

ELECTRICAL TERMINAL BLOCK AND METHOD OF FIXTURE

This invention relates to an electrical terminal block and to a method of fixing an electrical terminal block to a fixed support. The purpose of the present invention is to simplify the way in which an electrical terminal block may be attached to a fixture such as a DIN rail.

The present invention provides an electrical terminal block whose base has four or more lugs projecting downwardly from a generally flat undersurface for locking the block against a fixed support having edges which are co-planar in a plane parallel to the block's undersurface; at least two of the lugs being formed with opposed channels, each open at one side for receiving and laterally abutting against one of two corresponding oppositely-extending edges of the fixed support so as to lock the block against the support, at least two others of the lugs being stops for laterally abutting corresponding edges of the fixed support; whereby the block may be fixed to the support by resting its undersurface against the block and twisting it in the plane of the undersurface until all the lugs are in abutment against the corresponding edges.

The invention also provides a method of attaching an electrical terminal block to a fixed support, comprising locating an undersurface of the block against a surface of the support to align plural projections from the undersurface with corresponding laterally-extending edges of the support, then twisting the block relative to the support, in a plane parallel to the undersurface, to lock them together.

Electrical terminal blocks embodying the invention may be manufactured relatively inexpensively. Further, the twist and snap fit action in the preferred embodiment facilitates the fixture of the block on to a DIN rail, for example. In the preferred embodiment, the block is removable from the fixture by reversing the twist process, and this allows it to be repositioned or replaced.

In order that the invention may be better understood, preferred embodiments of the invention may now be described, by way of example only, with reference to the accompanying drawings in which.

FIGS. 1 to 4 show from different perspectives an electrical terminal block embodying the invention. The block is an integral plastics moulding with inserted electrically conductive metallic components constituting terminals and interconnections between the terminals. The block 10 has a generally parallelepiped shape with a square section when viewed from above. The main portion 11 of the terminal block 10 has two bores 12a, 12b in a central portion 16 between two side portions 13a, 13b which house the six electrical terminals 14a, 14b. Each terminal 14a, 14b has access for the bared end of an electrical wire (40, FIG. 6 described below) which is secured by one of six respective screws 15a, 15b, as is conventional and well-known. Electrical interconnections between the terminals are provided in the form of conductive bars, not shown, whose configuration depends upon the intended function of the terminal block. In this example, light pipes 17 which extend vertically within slots formed in the central portion of the housing 11, between the apertures 12a, 12b, are provided for carrying light from light-emitting diodes (LEDs), mounted on a printed circuit board (PCB) within the block to the exterior of the block to enable them to be seen Although not shown in this specification, electrical or electronic circuitry may be connected to different terminals, such as sprung terminals which mate with external terminals, as well as, or instead of, the terminals 14 shown. In some applications, electronic circuitry may be integrated in the electrical terminal block 10. Examples of electronic circuitry to which the invention may be applied include relays and other forms of switch and communications circuitry.

Figure 1:
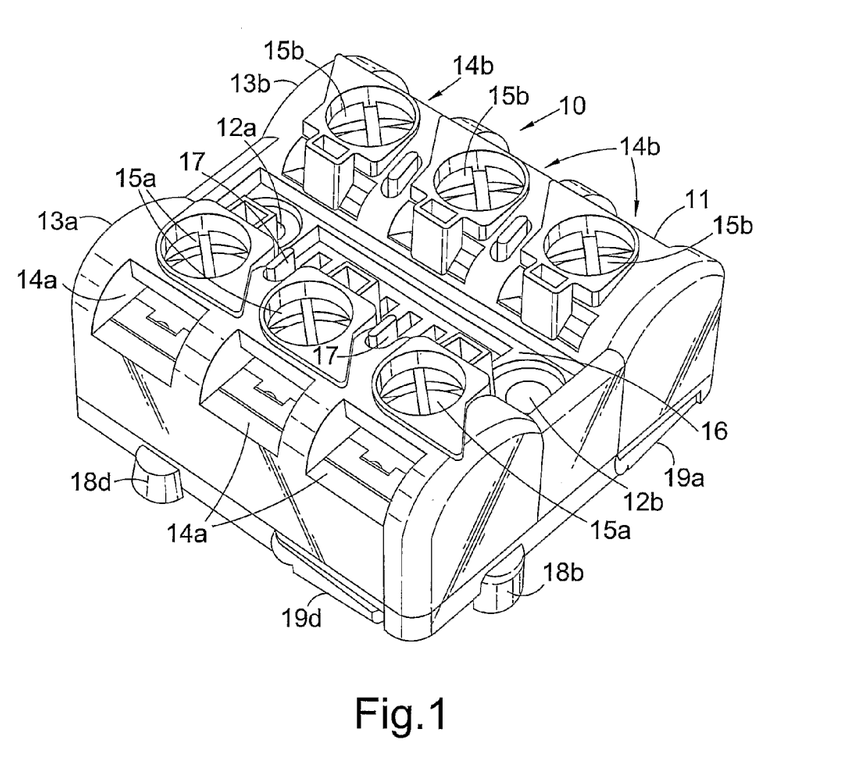
FIG. 1 is a perspective view of an electrical terminal block embodying the invention.
Figure 2:
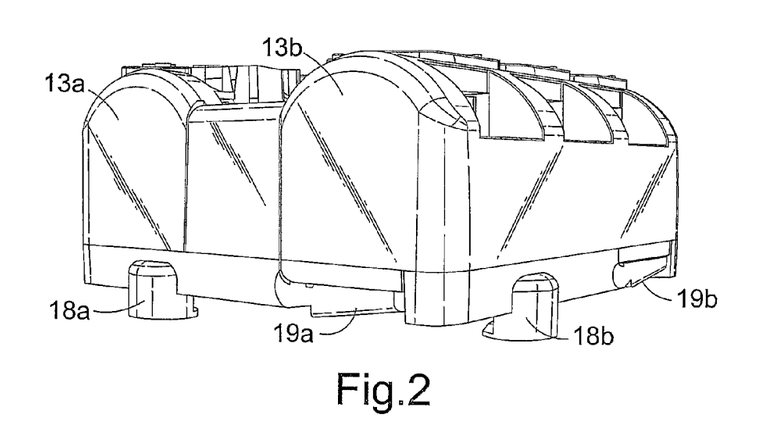
FIG. 2 is a perspective side view of the block of FIG. 1.
Figure 3:
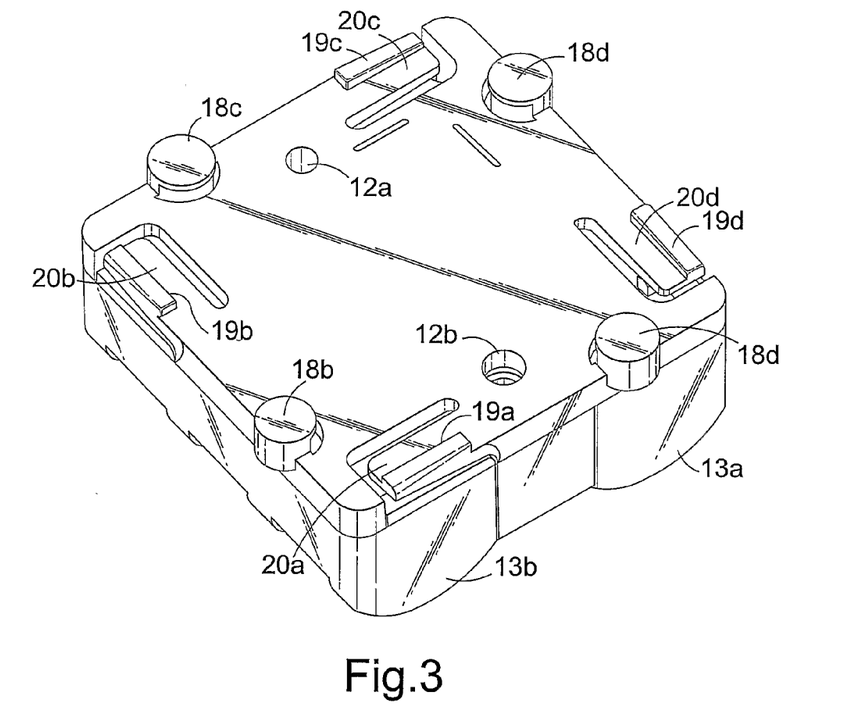
FIG. 3 is a perspective underneath view of the block of FIG. 1.
Figure 4:
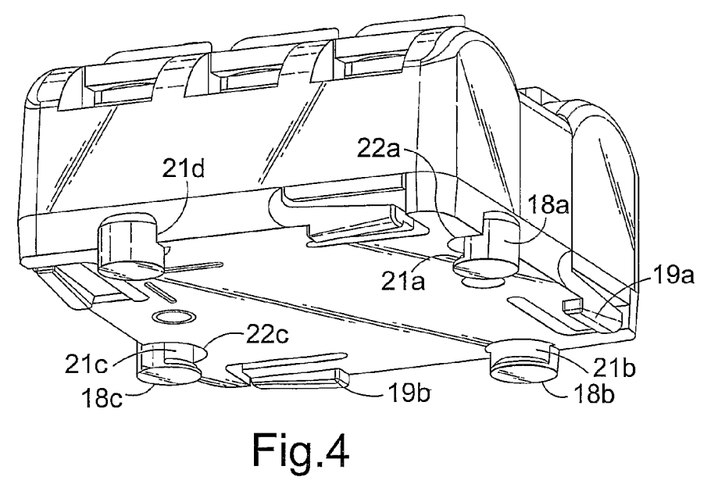
FIG. 4 is a perspective view from underneath and from one side of the block of FIG. 1.
Figure 5:
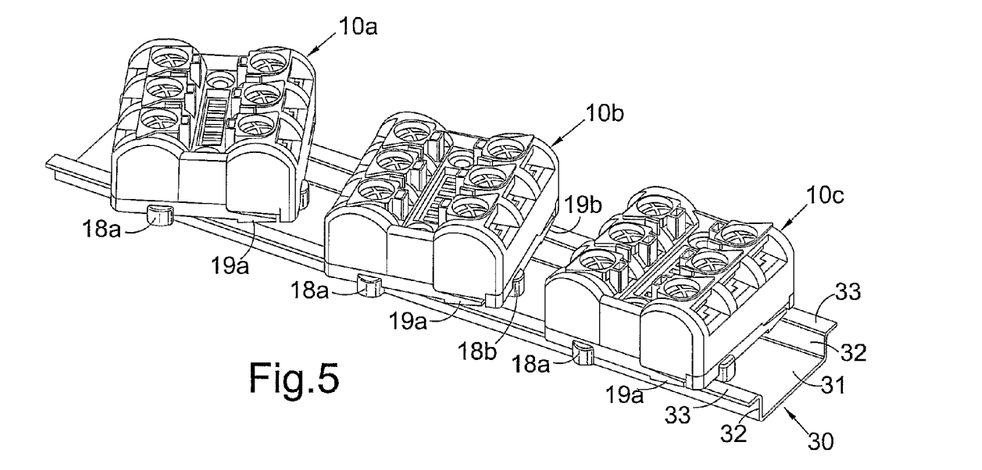
FIG. 5 is a perspective view of a DIN rail showing the block of FIG. 1 in different orientations as it is twisted with a snap fit onto the rail.

The terminal block 10 may be removably fixed to a DIN rail 30 as shown in FIG. 5, by means of an arrangement of lugs 18, 19 projecting downwardly from the otherwise flat undersurface of the block. On each of the four edges of the square undersurface, there is a channelled lug 18a to 18d in the form of a foot with a flat undersurface; and a corresponding elongate, wedge-shaped stop lug 19a to 19d. Each stop lug 19a to 19d projects from a tongue 20a to 20d forming part of a base plate of the terminal block 10, and resiliently deformable upwardly to allow the outer facing surface of the stop lug to be coplanar with the undersurface of the block. In the normal position of each tongue, the wedge shaped stop lug 19a to 19d projects from the undersurface plane a distance which corresponds to the depth of a channel 21a to 21d formed in each of the channelled lugs 18a to 18d. As shown best in FIG. 4, the channel of each channelled lug is defined by a re-entrant surface which faces the planar undersurface of the block. In this example, the base plate of the block has semicircular portions of which two are illustrated as 22a, 22c in FIG. 4, and these accommodate the channelled lugs 18a to 18d with an air gap.

In this example, each stop lug 19a to 19d is elongate along the edge of the block, and its outward surface is inclined so that it is thicker the closer it gets to its corresponding channelled lug on the same edge of the block. However, whilst this shape of wedge is convenient for facilitating separation of the block from a DIN rail, as described below, its shape is not critical, and the wedge shape is not essential.

Figure 6:
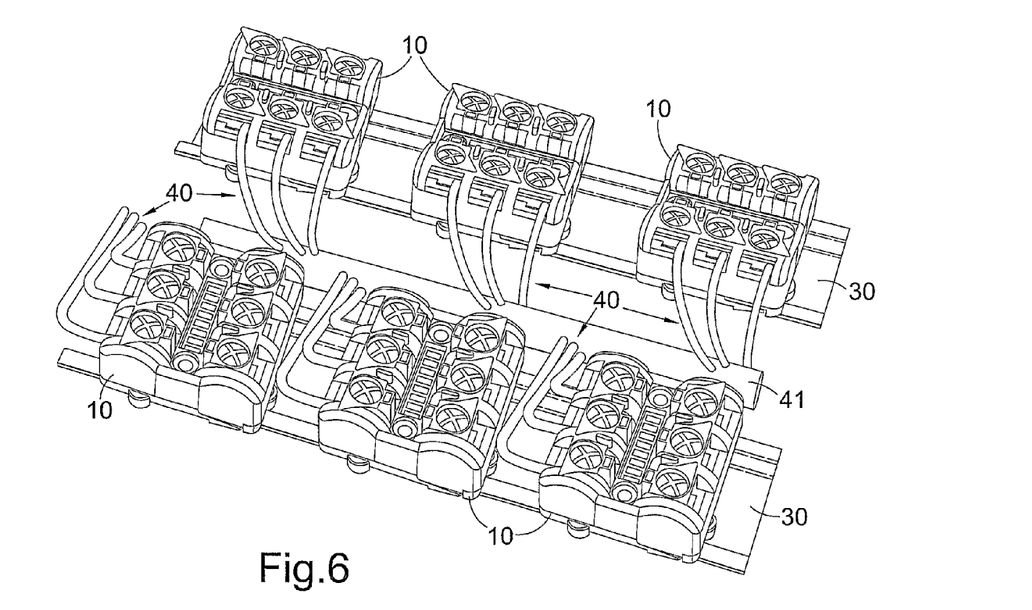
FIG. 6 is a perspective view corresponding to FIG. 5 but showing two adjacent DIN rails with blocks as shown in FIG. 1 mounted upon the rails.

With reference to FIGS. 5 and 6, the block 10 may be fixed to a DIN rail 30 at any of four orientations separated rotationally by a right angle. The blocks 10 on the top of FIG. 6 are at right angles to the positions of the blocks in the lower part of the figure. This is possible because there are four sets of channelled lugs 18a to 18d with their corresponding stop lugs 19a to 19d. As will be explained below, only two pairs of lugs are necessary for the fixture, the other two being redundant for a given orientation of the block relative to the rail. This redundancy assists in rapid assembly of the blocks onto the rails in use. It also gives flexibility as to the angular orientation to suit wiring requirements for example.

The method of fixing the block 10 onto the DIN rail will now be described with reference to FIGS. 5 and 6. The sequence of positions of the block is shown as positions 10a, 10b and 10c in FIG. 5, with rotational clockwise movement being applied to the block to fix it to the rail with a snap fit. Initially, the block 10a is arranged over the rail 30 with two of the channelled lugs arranged between opposite flanges 32, 33 of the lug 30. The other channelled lugs 18a, 18c are arranged outside respective coplanar, oppositely extending flanges 33. The wedge shaped stop lugs 19a, 19c are arranged on the flat upper surfaces of the flanges 33 which are parallel to the main, base portion of the rail 30. The block 10b is then twisted clockwise and depressed against the surfaces 33 of the flanges, so as to cause the stop lugs 19a, 19c to rise, at the same time allowing the channels 21a, 21c to accommodate the edges of the flanges 33. As the block 10c is twisted to its final position aligned with the rail 30, the stop lugs 19a, 19c spring outwardly to their normal positions, thus locking the block against the outwardly facing edges of the flanges 33. Each flange 33 thus abuts against the side surface of a corresponding channel 21a, 21c, and the side surface of a corresponding stop lug 19a, 19c. These side surfaces, being locked, prevent rotational movement of the block relative to the rail in either direction. The re-entrant surfaces of the channels 21a, 21c which abut against the undersurfaces of the flanges 33 prevent normal separation of the block from the rail. Depending upon the precise shape of the block, and the tolerances involved, the snap fit may be such as to allow the block to slide along the rail, or else to provide substantial frictional resistance to sliding motion. Each block on a rail, or selectively just the end blocks, may be more permanently fixed by screws or other forms of fixture, which may use the apertures 12a, 12b.

The block 10c may be removed from the rail 30 by reversing the process described above, during which the wedge shaped stop lugs 19a, 19c slide over the surfaces of the flanges 33.

With reference to FIG. 6, any number of blocks 10 may be fixed to any number of DIN rails 30. In a convenient arrangement, DIN rails 30 are arranged parallel to one another, with a cable tray 41 disposed parallel to the rails in between each pair of rails, for accommodating portions of interconnecting electrical wires 40.

The lugs 18, 19 do not have to be in a square configuration, since the block could have the same form of fitment to a wide variety of fixed supports not all of which may have regular shapes. Also, the lugs need not be on the edges of the block. Examples of alternative embodiments of the invention are blocks which are rectangular section parallelepiped shapes; and circular section blocks. In some examples, there may only be two channelled lugs and two corresponding stop lugs.

By making the channelled lugs 18a to 18d in the shape of feet, i.e. with flat undersurfaces in a common plane, the block may rest stably on any form of flat surface. Accordingly, it may be used screwed to a flat surface or board, rather than snap fit onto a rail.

Figure 7:
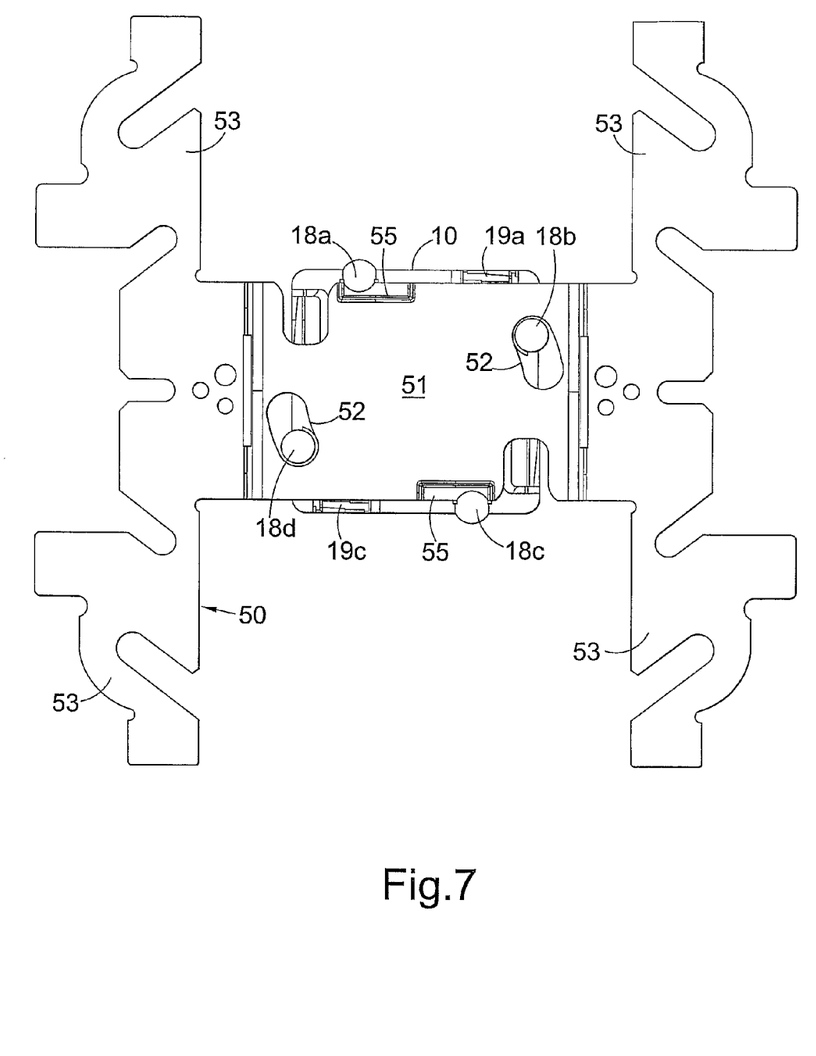
FIG. 7 is a plan view from underneath of an adaptor plate on which is fixed a block as shown in FIG. 1.
Figure 8:
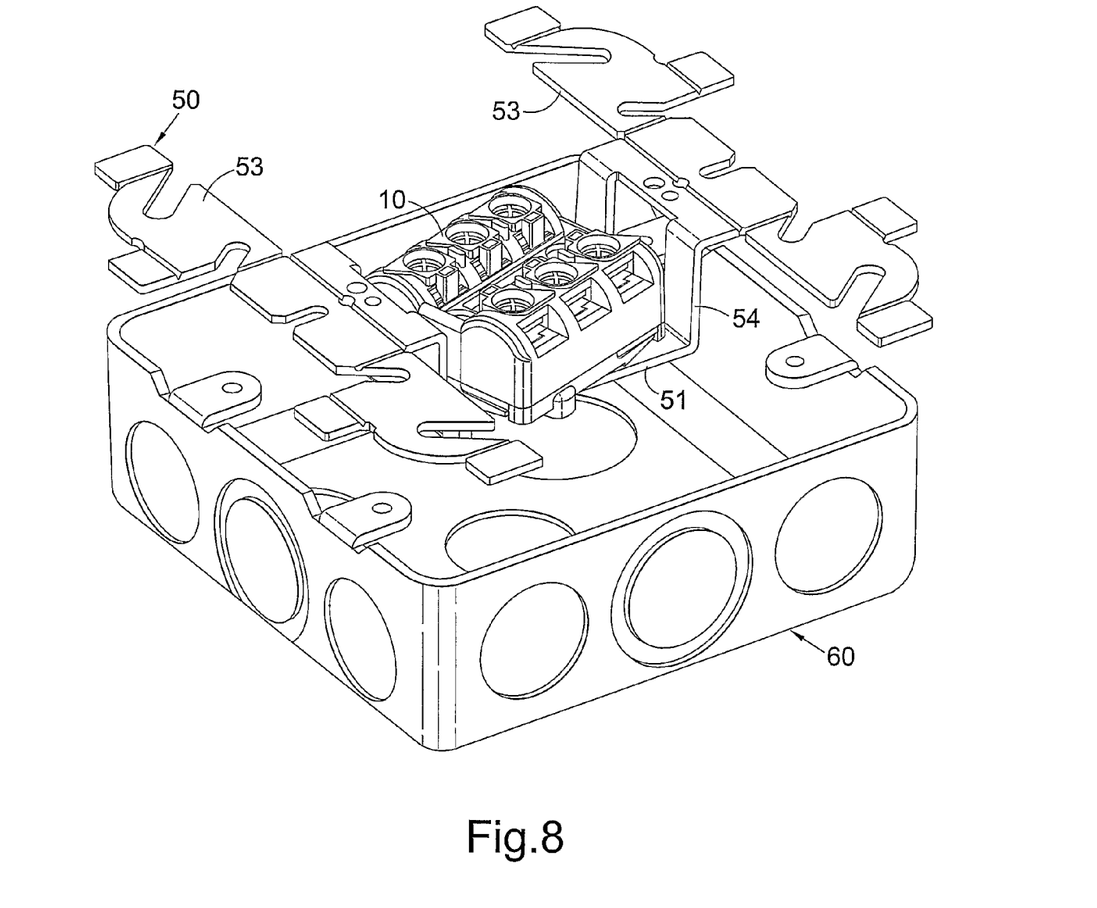
FIG. 8 is a perspective view from above of the adaptor plate of FIG. 7 in which the block of FIG. 1 is held ready to be twisted with a snap fit to the positions shown in FIGS. 7 and 9, and arranged over an electrical housing for accommodating the block and adaptor plate.
Figure 9:
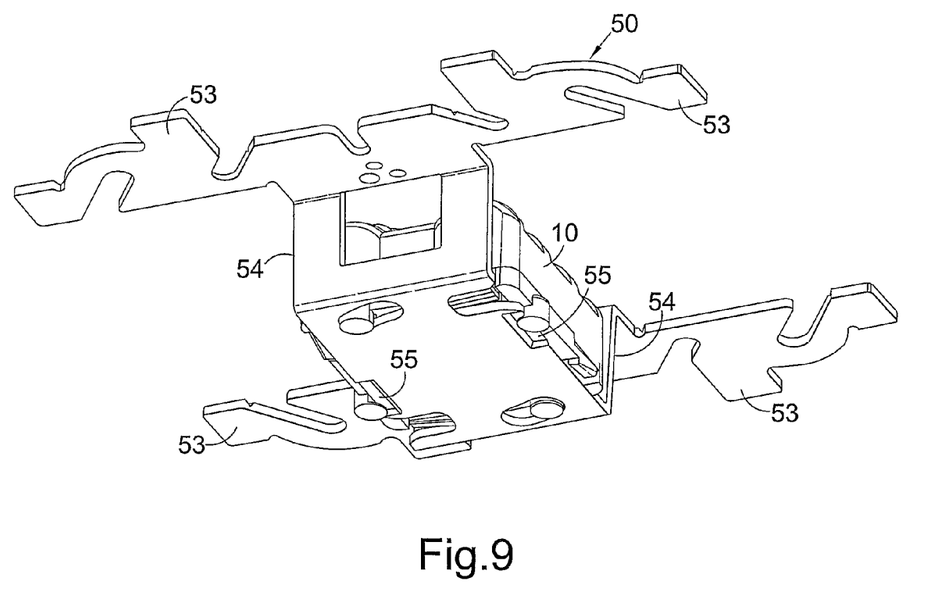
FIG. 9 is a perspective view from underneath of the adaptor plate and block of FIG. 7.

As shown in FIGS. 7 to 9, an adaptor plate 50 against which the block 10 may be fixed with a snap fit is used to allow the block to be accommodated securely in an electrical housing 60, potentially with other electrical or electronic circuitry such as switching circuitry. The adaptor plate 50 is formed with a central web 51 which is planar with parallel edges, and which joins four corner flanges 53 which have formations allowing them to be secured to walls of a conventional electrical housing 60. The central web 51 is integrally formed with perpendicular side portions 54 which are integrally formed with the pairs of flanges 53. This allows the block 10 to be disposed below the plane of the flanges 53 and thus comfortably within the housing 60.

The block 10 is fixed with a snap fit to the central web portion 51 in a manner similar to that described above with reference to FIG. 5. The straight edges of the web portion 51 have the same function as the flanges 33 of the rail 30. In this example, the web portion 51 is formed with special ledges 55 which are recessed from the plane of the web portion 51 to facilitate their engagement with the channels 21. Further, a pair of apertures 52 are provided in the central web portion 51, with widths corresponding to the diameter of the channelled lugs 18b, 18d. By making these apertures 52 elongate and arcuate, this accommodates a limited amount of twisting motion of the block 10 relative to the adaptor plate 50, with the channelled lugs 18b, 18d protruding through the apertures. Once the block is snap fit in place, as shown in FIGS. 7 and 9, the edges of the apertures 52 prevent sliding motion of the block along the length of the web portion 51.

In this example, the adaptor plate 50 is made of plastics material in a single moulding, although it could be metallic; and it is made resiliently deformable to facilitate the snap fit function of the block onto the web portion 51, and to facilitate separation of the block from the plate by disengaging lugs 19a and 19c from the edges of the web portion and/or its apertures and twisting the block relative to the plate.

The invention claimed is:

1. An electrical terminal block, comprising:
    four or more lugs projecting downwardly from a generally flat undersurface of the block's base for locking the block against a fixed support,
    wherein the fixed support has edges which are co-planar in a plane parallel to the block's undersurface,
    wherein at least two of the lugs are formed with opposed channels, each open at one side for receiving and laterally abutting against one of two corresponding oppositely-extending edges of the fixed support so as to lock the block against the support, and
    wherein at least two others of the lugs are stops for laterally abutting corresponding edges. of the fixed support, whereby the block may be fixed to the support by resting its undersurface against the block and twisting it in the plane of the undersurface until two of the at least two, channelled lugs and two of the at least two stop lugs are in abutment against the corresponding edges.

2. An electrical terminal block according to claim 1, wherein each stop lug is aligned with a corresponding channelled lug,
    wherein a line joining a first stop lug with a first channelled lug is parallel to a line joining a second stop lug with a second channelled lug, so that they are arranged to lock against the fixed support, and
    wherein the fixed support has parallel opposed edges.

3. An electrical terminal block according to claim 1, wherein each stop lug is resiliently moveable upwardly, normal to the undersurface, when depressed, to 4. An electrical terminal block according to claim 1, wherein the channelled lugs are feet with flat support surfaces parallel to the undersurface of the block.

5. An electrical terminal block according to claim 1, wherein each channel is defined by the undersurface and by an opposed, parallel re-entrant surface.

6. An electrical terminal block according to claim 1, wherein the electrical terminal block further comprises four of the channelled lugs and four corresponding stop lugs.

7. An electrical terminal block according to claim 6, wherein each channelled lug is aligned with its corresponding stop lug along a different side of a quadrilateral.

8. An electrical terminal block according to claim 7, wherein the quadrilateral is a square, so that the block may be locked to the support at any of four orientations spaced rotationally by a right angle.

9. An electrical terminal block according to claim 8, wherein the electrical terminal block is generally in the form of a parallelepiped.

10. An apparatus, comprising:
an electrical terminal block; and
a fixed support,
wherein the block comprises four or more lugs projecting downwardly from a generally flat undersurface of the block's base for locking the block against a fixed support,
wherein the fixed support has edges which are co-planar in a plane parallel to the block's undersurface,
wherein at least two of the lugs are formed with opposed channels, each open at one side for receiving and laterally abutting against one of two corresponding oppositely-extending edges of the fixed support so as to lock the block against the support, and
wherein at least two others of the lugs are stops for laterally abutting corresponding edges of the fixed support, whereby the block may be fixed to the support by resting its undersurface against the block and twisting it in the plane of the undersurface until two of the at least two channelled lugs and two of the at least two stop lugs are in abutment against the corresponding edges.

11. An apparatus according to claim 10, having at least one support wherein each support is a rail and having a plurality of electrical terminal blocks locked onto each rail in a row, and having electrical wires connected to the terminal blocks.

12. An apparatus according to claim 10, wherein the support is a rigid rail having co-planar, oppositely extending flanges constituting the edges against which the lugs of the block are lockable.

13. An apparatus according to claim 12, wherein the rail is a DIN rail.

14. An apparatus according to claim 10, wherein the fixed support is an adaptor plate having a planar web portion integral with flanges for fixture to an electrical housing for the terminal block and other electrical components, the web portion having edges against which the lugs of the block may abut so that they lock the block to the adaptor plate.

15. An apparatus according to claim 14, wherein the edges of the web portion are parallel.

16. An apparatus according to claim 14, wherein the web portion has apertures for receiving some of the lugs of the block when the block is locked to the adaptor plate, to prevent relative sliding motion of the block and plate.

17. An apparatus according to claim 14, wherein the web portion of the adaptor plate is resiliently deformable to facilitate separation of the block from the plate by disengaging at least some of the lugs from the edges of the web portion and/or its apertures and twisting the block relative to the plate.

18. An apparatus according to claim 14, wherein the electrical terminal block is locked to the adaptor plate and the electrical housing accommodates the terminal block and the adaptor plate, the flanges of the adaptor plate being fixed to walls of the electrical housing.

19. A method of attaching an electrical terminal block to a fixed support, comprising:
locating an undersurface of the block against a surface of the support to align plural projections from the undersurface with corresponding laterally-extending edges of the support, wherein the plural projections are four or more lugs projecting downwardly from the undersurface of the block's base for locking the block against the fixed support; and
twisting the block relative to the support, in a plane parallel to the undersurface, to lock them together;
wherein at least two of the lugs are formed with opposed channels, each open at one side for receiving and laterally abutting against one of two corresponding oppositely-extending edges of the fixed support so as to lock the block against the support, and
wherein at least two others of the lugs are stops for laterally abutting corresponding edges of the fixed support, whereby the block may be fixed to the support by resting its undersurface against the block and twisting it in the plane of the undersurface until two of the at least two channelled lugs and two of the at least two stop lugs are in abutment against the corresponding edges.

20. A method according to claim 19, wherein the block has projections from its undersurface which are resiliently deformable to reduce the extent of their projection, to cause the block and the support to lock together with a snap fit.

21. A method according to claim 20, further comprising:
separating the block and support by resiliently deforming those projections and relatively twisting the block and support.

22. A method according to claim 19,
wherein the undersurface is generally flat,
wherein the fixed support has edges which are co-planar in a plane parallel to the block's undersurface.

23. A method according to claim 22, wherein the support is a rigid rail having co-planar, oppositely extending flanges constituting the edges against which the lugs of the block are lockable.

24. A method according to claim 22, wherein the support is an adaptor plate having a planar web portion integral with flanges for fixture to an electrical housing for the terminal block and other electrical components, the web portion having edges against which the lugs of the block may abut so that they lock the block to the adaptor plate.

25. A method according to claim 24, wherein the web portion of the adaptor plate is resiliently deformable to facilitate separation of the block from the plate by disengaging at least some of the lugs from the edges of the web portion and twisting the block relative to the plate.

26. A method of attaching an electrical terminal block to a fixed support, comprising:
locating an undersurface of the block against a surface of the support to align plural projections from the undersurface with corresponding laterally-extending edges of the support, wherein the block has projections from its undersurface which are resiliently deformable to reduce the extent of their projection, to cause the block and the support to lock together with a snap fit; and
twisting the block relative to the support, in a plane parallel to the undersurface, to lock them together.

27. A method according to claim 26, further comprising:
separating the block and support by resiliently deforming those projections and relatively twisting the block and support.

* * * * *

UNITED STATES PATENT AND TRADEMARK OFFICE
CERTIFICATE OF CORRECTION

PATENT NO. : 7,980,902 B2  Page 1 of 1
APPLICATION NO. : 12/449819
DATED : July 19, 2011
INVENTOR(S) : Alan Capaldi-Tallon It is certified that error appears in the above-identified patent and that said Letters Patent is hereby corrected as shown below:

On the title page, item [73]:

Please delete "FINE" and insert -- FIRE --.

Signed and Sealed this
Twentieth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,980,902 B2 | |
| APPLICATION NO. | : 12/449819 | |
| DATED | : July 19, 2011 | |
| INVENTOR(S) | : Alan Capaldi-Tallon | |

It is certified that error appears in the above-identified patent and that said Letters Patent is hereby corrected as shown below:

In the Claims section at Col. 4, line 3:

Claim 3 is not listed in its entirety. Please insert the following text at the end of the sentence in Claim 3

-- reduce the extent of its projection from the undersurface. --.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 7,980,902 B2  
APPLICATION NO. : 12/449819  
DATED : July 19, 2011  
INVENTOR(S) : Alan Capaldi-Tallon Page 1 of 1

It is certified that error appears in the above-identified patent and that said Letters Patent is hereby corrected as shown below:

In the Claims section, Column 4, line 55 (Claim 3, line 3)

Claim 3 is not listed in its entirety. Please insert the following text at the end of the sentence in Claim 3

-- reduce the extent of its projection from the undersurface. --.

This certificate supersedes the Certificate of Correction issued April 30, 2013.

Signed and Sealed this
Twenty-eighth Day of May, 2013

Teresa Stanek Rea
*Acting Director of the United States Patent and Trademark Office*